United States Patent [19]
Van Zanten et al.

[11] Patent Number: 5,403,074
[45] Date of Patent: Apr. 4, 1995

[54] ANTIBLOCK SYSTEM

[75] Inventors: Anton Van Zanten, Ditzingen; Rolf Maier, Kernen; Gerhard Kreisselmeier, Ahnatal, all of Germany

[73] Assignee: Robert Bosch GmbH, Stuttgart, Germany

[21] Appl. No.: 862,770

[22] PCT Filed: Dec. 10, 1990

[86] PCT No.: PCT/EP90/02138
§ 371 Date: Aug. 17, 1992
§ 102(e) Date: Aug. 17, 1992

[87] PCT Pub. No.: WO91/08935
PCT Pub. Date: Jun. 27, 1991

[30] Foreign Application Priority Data

Dec. 16, 1989 [DE] Germany ............... 39 41 655.0

[51] Int. Cl.⁶ ........................... B60T 8/60; B60T 8/66
[52] U.S. Cl. ................................. 303/100; 303/111
[58] Field of Search ............... 303/92, 100, 110, 105, 303/113.1, 111, 106; 180/233, 244

[56] References Cited

U.S. PATENT DOCUMENTS

| | | | |
|---|---|---|---|
| 3,840,278 | 10/1974 | Fleischer et al. | 303/96 |
| 4,055,911 | 2/1977 | Klatt et al. | 43/55 |
| 4,154,487 | 5/1979 | Vannini et al. | 303/106 |
| 4,593,955 | 6/1986 | Leiber | 303/106 |
| 4,961,476 | 10/1990 | Witte et al. | 303/100 |
| 4,962,970 | 10/1990 | Jonner et al. | 303/100 |
| 5,172,959 | 12/1992 | Eickhoff et al. | 303/100 |

FOREIGN PATENT DOCUMENTS

| | | |
|---|---|---|
| 0381957 | 8/1990 | European Pat. Off. . |
| 3114026 | 3/1982 | Germany . |
| 2705737 | 4/1988 | Germany . |

*Primary Examiner*—Matthew C. Graham
*Attorney, Agent, or Firm*—Spencer, Frank & Schneider

[57] ABSTRACT

A two-channel antiblocking system for the driven wheels of an axle in which either an electronic decoupling system is connected downstream of the channels, or the channels are fed the sum (channel 1) or the difference (channel 2) of the wheel speed signals, specific controllers being used for the sum and difference, and the outputs of these controllers being on the one hand added to the actuating signal for the first channel and, on the other hand, subtracted from the actuating signal for the second channel. The aim of both measures is to compensate at least partially the coupling, caused by the differential, that is present between two drive wheels.

6 Claims, 4 Drawing Sheets

$$V1 = \frac{4J + JG}{2J(JG + 2J)}$$

$$V2 = \frac{JG}{2J(JG + 2J)}$$

5,403,074

ANTIBLOCK SYSTEM

BACKGROUND OF THE INVENTION

The present invention relates to an antiblocking system for the driven wheels of an axle of a vehicle. More particularly, the present invention relates to an improvement in such a system in order to at least partially compensate for the mechanical coupling between two driven wheels of an axle due to the differential connected therebetween.

Torques are transmitted between the driven wheels of a vehicle as a consequence of their coupling via a differential. This is shown in FIG. 1a. There, the drive wheels are denoted by 1 and 2, the differential by 3 and the gearbox by 4. The rotational wheel speeds are denoted by $\omega_1$ and $\omega_2$ respectively, the braking torques by $M_{B1}$ and $M_{B2}$ respectively, and the drive torques by $M_{S1}$ and $M_{S2}$ respectively. J are the moments of inertia. FIG. 1b shows the arrangement of FIG. 1a in a representation in terms of control engineering. The variables $V_1$ and $V_2$ are gains. It can be seen that the difference in the torques (at 5) of each wheel passes with a gain $V_1$ to the associated wheel, and with a different gain $V_2$ to the other wheel where it is superimposed on the torque differential of the respective wheel (at 6). The gains $V_1$ and $V_2$ are specified in the form of formulae where $$V_1 = \frac{4J + J_G}{2J(J_G + 2J)} \text{ and } V_2 = \frac{J_G}{2J(J_G + 2J)}.$$

The integrators 7 convert the torques into rotational wheel speeds $\omega_1$ and $\omega_2$. The slip controllers 8 influence the drive torques $M_{S1}$ and $M_{S2}$.

As FIG. 2 shows, these coupling torques are not considered in previous ABS control concepts. Individual wheel controllers 9 and actuators 10 for brake pressure control are represented in this figure. Block 11 here contains both the controlled system with the (internal) coupling of the two wheel torques, and the two rotational speed sensors for the drive wheels. This coupling acquires a pronounced influence particularly with the driving position engaged, and can impair the control response in ABS braking.

SUMMARY OF THE INVENTION

The above disadvantages can be avoided according to the invention by regarding the driven wheels not as independent, individual controlled systems, but as a multivariable system, and correspondingly designing a multivariable controller for its control. This results both in an improvement of the control quality and in an increase in the stability of the control loop. The concepts to be described are designed such that conventional ABS control algorithms can largely be employed.

According to a first concept or embodiment of the invention, an antiblocking system for the driven wheels of an axle is provided and contains sensors for determining the respective wheel speeds, a two-channel evaluation circuit to which the respective wheel speed signals are fed and which generates brake pressure control signals for the respective wheels, and brake pressure control devices, responsive to the brake pressure signals for varying the brake pressure of the respective wheels to prevent blocked wheels, and wherein decoupling means are provided for at least partially compensating for coupling of the driven wheels due to the differential, with the decoupling means supplementing the evaluation circuit to form a two-variable controller and being connected to produce electronic coupling between the channels downstream of the evaluation circuit, with this decoupling means having a transfer matrix G(z) whose elements G1(z) and G2(z) determine its output variables $u'_1(z)$ and $u'_2(z)$ in accordance with the relationships $u'_1(z) = G1(z)\bar{u}_1(z) + G2(z)\bar{u}_2(z)$ or $u'_2(z) = G2(z)\bar{u}_1(z) + G1(z)\bar{u}_2(z)$, where $\bar{u}'_1(z)$ and $\bar{u}'_2(z)$ are the respective analog output signals of the two channels of the evaluation circuit and the elements G1(z) and G2(z) of the matrix are constants determined for the purpose of effective decoupling.

According to a further concept or embodiment of the invention, in an antiblock system for the driven wheels of an axle containing sensors for determining the respective wheel speeds, a two-channel evaluation circuit to which the respective wheel speed signals are fed and which generates respective brake pressure control signals, and brake pressure control devices, responsive to the brake pressure control signals, for varying the brake pressure in order to prevent blocked wheels, a control arrangement is provided wherein: one channel is fed as an input value a variable corresponding to the sum of the two speed signals of the respective wheels, and the other channel is fed as an input value a variable corresponding to the difference of the two speed signals of the respective wheels; the controller of the first channel is an individual wheel controller (for example, a slip controller) and the controller of the second channel has a control characteristic which has at least proportional and integral components; the actuating signal for the actuator of the first channel is formed by addition of the output signals of the two controllers; and the actuating signal for the actuator of the brake pressure control device of the second channel is formed by subtraction of the output signals of the two controllers.

DETAILED DESCRIPTION OF THE PREFERRED EMBODIMENT

Figure 1A:
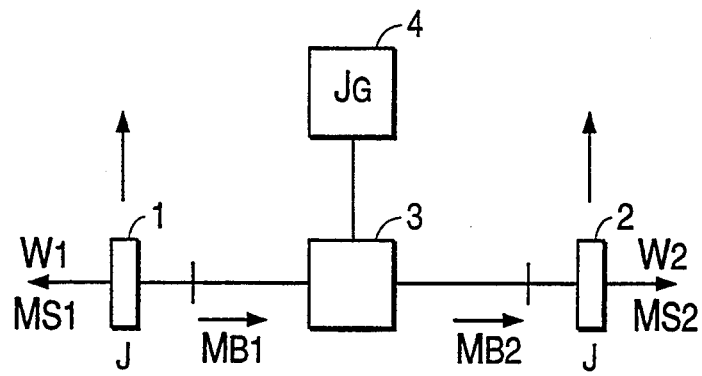
FIG. 1a is a schematic illustration showing two driver wheels on an axle and coupled via a differential and illustrating the related wheel speeds and torques.
Figure 1B:
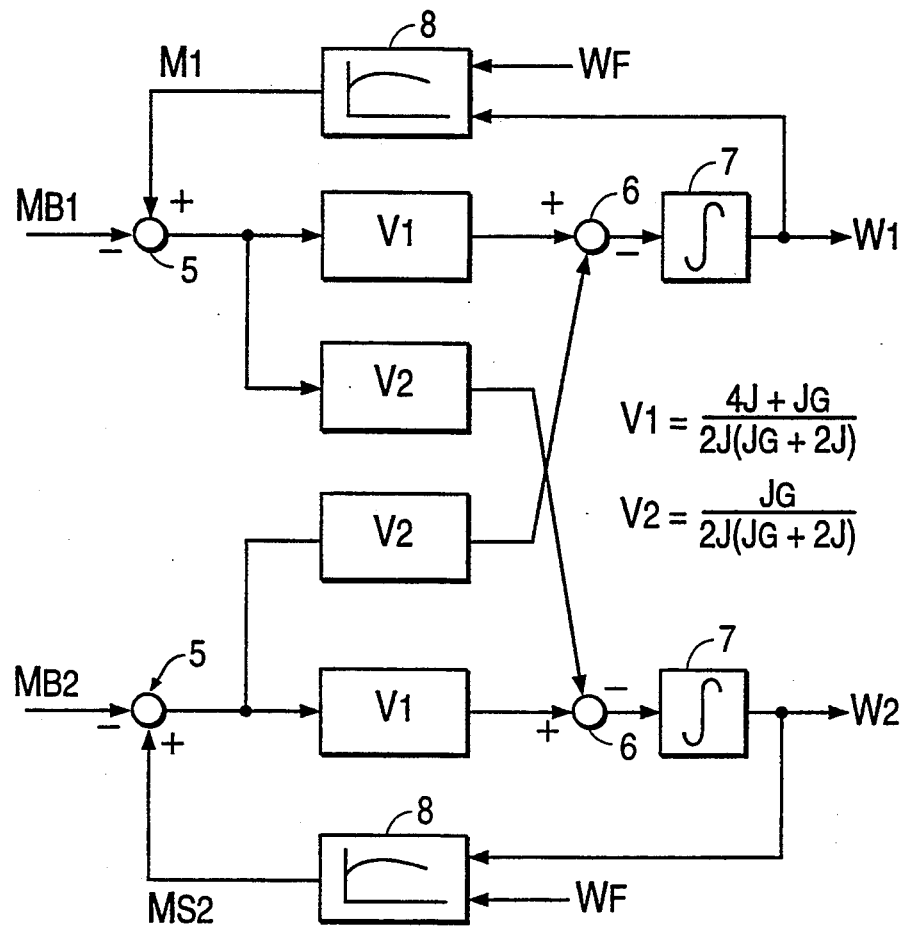
FIG. 1b is a representation of the arrangement of FIG. 1 in term of control engineering.
Figure 2:
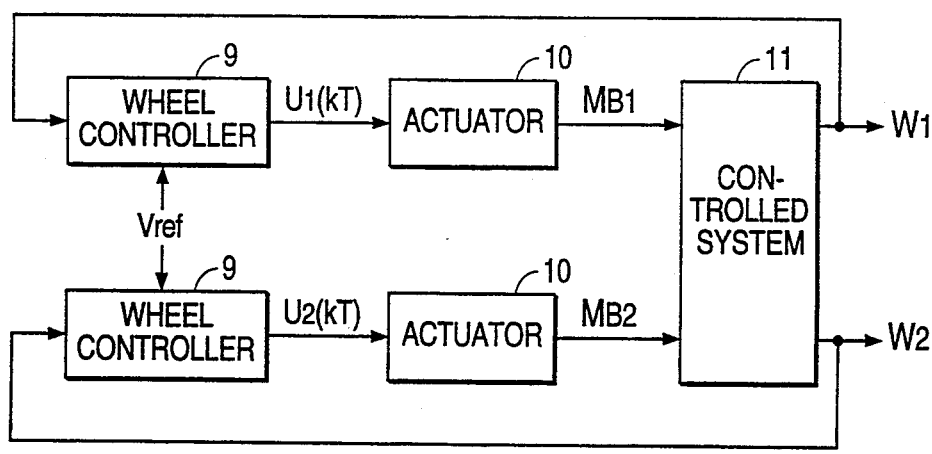
FIG. 2 is a schematic block diagram showing the normal manner of controlling an antiblocking brake control system.
Figure 3:
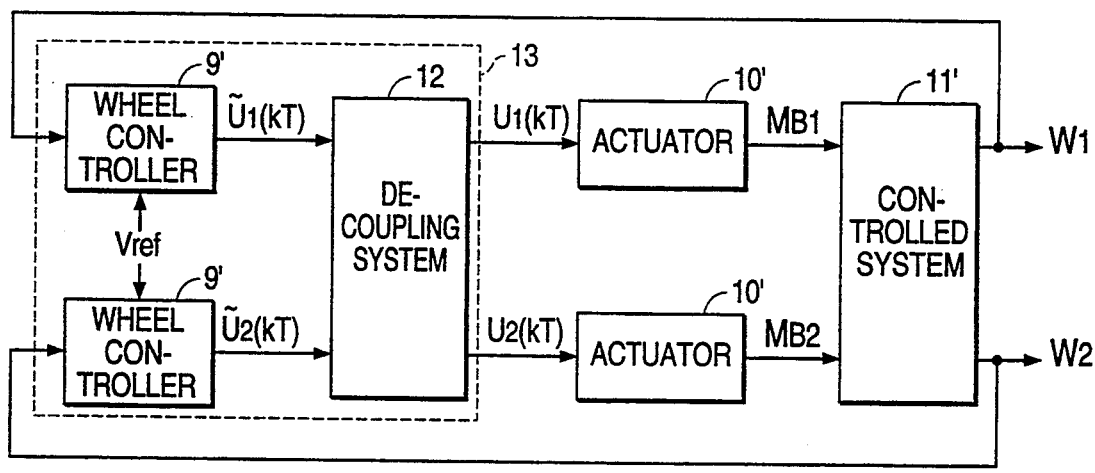
FIG. 3 is a schematic block diagram of a control arrangement according to a first embodiment of the invention for controlling an antiblocking brake control system.

The concepts described below supplement the conventional individual wheel controllers by using a decoupling system to form a multivariable controller. The first concept to be described relates to series decoupling. The basic concept here is to connect a decoupling system downstream of the individual wheel controllers, in order to compensate the wheel coupling at least partially. This is shown in principle in FIG. 3, which otherwise largely corresponds to FIG. 2 (denoted by primed reference symbols). The decoupling system 12 additionally represented forms a two-variable controller 13 with the individual wheel controllers 9'.

Figure 4:
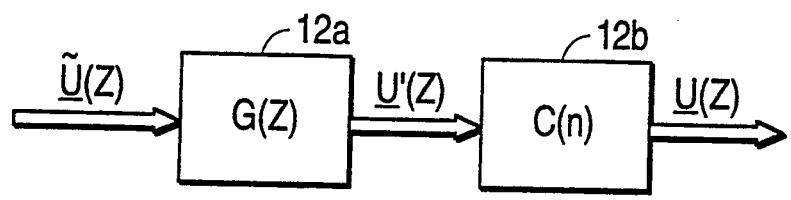
FIG. 4 is a schematic block diagram of the decoupling system of FIG. 3.

The output variables of the individual wheel controllers 9' are signals which are proportional to the braking torque or to the change in the braking torque. The decoupling system 12 can consist of a linear two-variable system 12a and a downstream amplifying element 12b with a gain of $C_n$, as represented in FIG. 4. The task of the linear two-variable system is to decouple the system, which is linearised about a specific working point.

It can be represented in the frequency range (image range of the z-transformation) by:

$$\underline{u}'(z) = G(z) * \underline{u}(z)$$

Here $$G(z) = \begin{matrix} G1(z) & G2(z) \\ G2(z) & G1(z) \end{matrix} \quad \ldots \text{ transfer matrix,}$$

$\overline{\underline{u}}(z) = [\overline{u}1(z) \quad \overline{u}2(z)]^T$ ... vector of the output signals of the individual wheel controllers, and $\underline{u}'(z) = [u1'(z) \quad u2'(z)]^T$ ... vector of the output variables, which the system receives The rational functions $G1(z)$ and $G2(z)$ are selected such that good decoupling exists in the guide transfer behaviour for typical working points of the control. These functions can be established experimentally. In this case, the procedure is, for example, to stipulate a constant setpoint for one wheel, but a setpoint step-change for the other. $G1(z)$ and $G2(z)$ are to be so designed that the wheel with a constant setpoint is disturbed as little as possible by the other wheel. If there is a precise system model, $G1(z)$ and $G2(z)$ can be determined in such a way that the coupling terms in the guide transfer function vanish. An important special case of the transfer matrix $G(z)$ is the static decoupling matrix $$G(z) \quad \begin{matrix} g1 & g2 \\ g2 & g1 \end{matrix} ,$$

where g1, g2=const.

Figure 5:
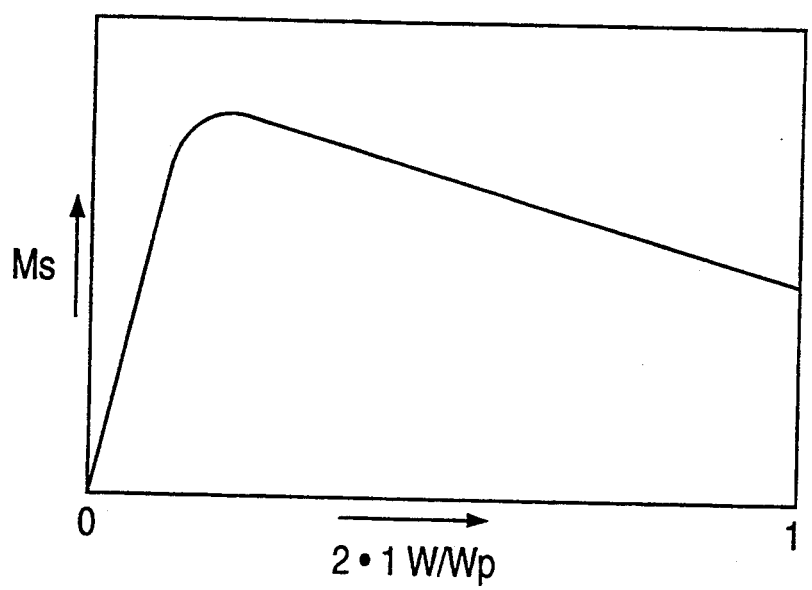
FIG. 5 shows the $\mu$-slip curve used to explain a feature of the invention.

The system is decoupled effectively given a suitable selection of g1 and g2, if both wheels are controlled at the maximum of the $\mu$-slip curve (FIG. 5). It then holds that:

$$\underline{u}'_1 = (g_1 * \overline{\underline{u}}_1 + g_2 * \overline{\underline{u}}_2)$$

or $$\underline{u}'_2 = (g_2 * \overline{\underline{u}}_1 + g_1 * \overline{\underline{u}}_2).$$

The downstream amplifying element 12b with the gain $C_n$ takes account of a possible nonlinearity in the actuators 10 (manipulated variable limitation). If, for example, algorithms such as those disclosed in German Offenlequngsschrift 3,731,075 and WO 86/07321 are used as individual controllers, the signals u1(kT), u2(kT) fed to the actuators 10 are valve opening times.

The latter are limited by the duration of a scanning cycle. In order to prevent this limitation from disturbing the decoupling, the amplifying element 12b carries out a preliminary limitation in accordance with the standard $$\underline{u}(kT) = Cn(\underline{u}'(kT)) * \underline{u}'(kT)$$

where $$Cn(\underline{u}'(kT)) = \frac{T}{\max(T, |\underline{u}'_1(kT)|, |\underline{u}'_2(kT)|)},$$

$T$ ... scanning period,
$\underline{u}'$ ... input vector into the amplifying element 12b, and
$\underline{u}$ ... actuating signal.

It is possible in addition to the influence of the limitation of the manipulated variable also to take account in $C_n$ of the influence of different rates of pressure change (for example due to different wheel brake pressures) in the wheel brake cylinders.

A further possibility for decoupling the wheels of a drive axle consists in two controllers connected in parallel:

In this concept, as well, the intention is to take account of the coupling of two drive wheels via a differential by supplementing a conventional single-wheel controller.

Figure 6:
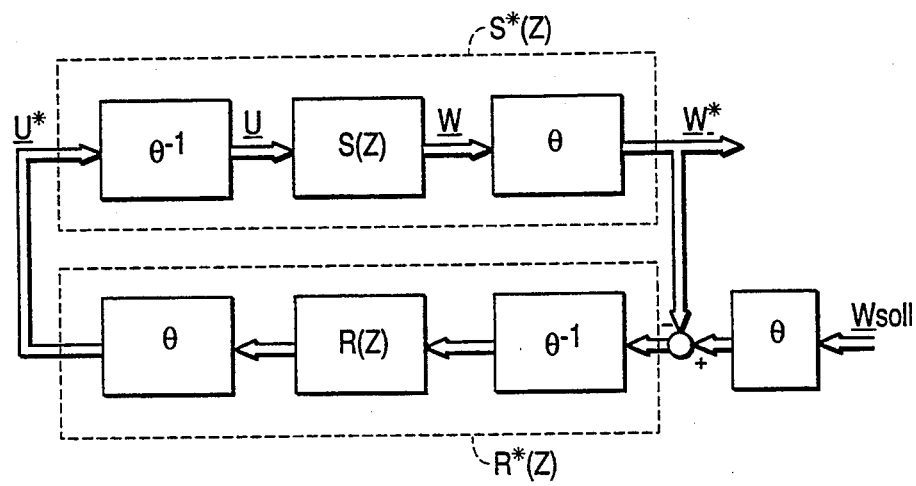
FIG. 6 is a general block diagram showing a control concept according to a further embodiment of the invention.
Figure 7:
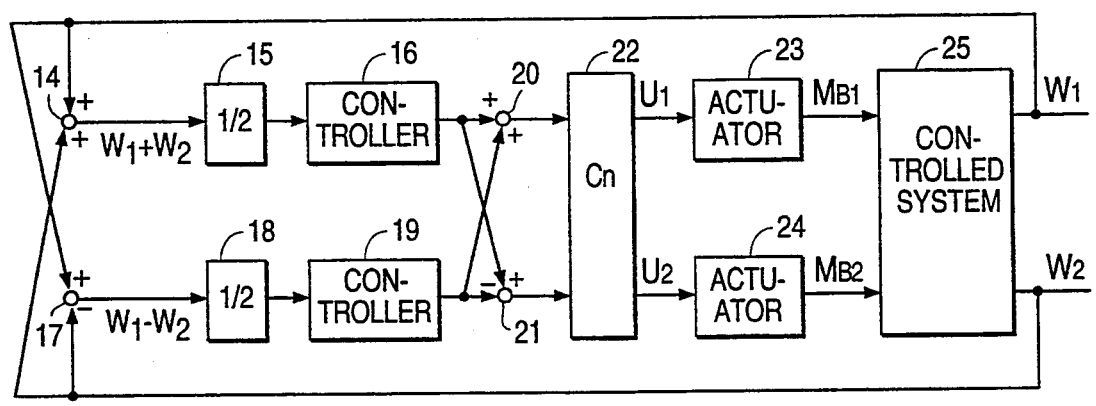
FIG. 7 is a block diagram of a controller according to the further embodiment of the invention.

For this purpose, a different method of multivariable control is used here, i.e., to be precise, the transformation of the controller system. In accordance with the number of the controlled variables, this makes it possible to design independent individual controllers, and thus simplifies the controller design. Such a concept is shown in FIG. 6. The transformation $\underline{\omega}^* = \theta * \underline{\omega}, \ \underline{\omega} = [\omega_1, \omega_2]^T$ ... rotational wheel speeds,
$\underline{\omega} = [\omega_1^*, \omega_2^*]^T$ ... transformed controlled variables $$\theta = \frac{1}{2} * \begin{matrix} 1 & 1 \\ 1 & -1 \end{matrix}$$

or $\underline{u} = \theta^{-1} * \underline{u}^*, \ \underline{u} = [u1 \ u2]^T$ ... actuating signal,
$\underline{u}^* = [u1^* \ u2^*]^T$ ... transformed actuating signal, $$\theta^{-1} = \begin{matrix} 1 & 1 \\ 1 & -1 \end{matrix}$$

is suitable in the case of the control of two driven wheels. This transformation corresponds to separate control of the total and differential rotational wheel speed. Such a controller arrangement is shown in FIG. 7.

If both wheels are controlled about working points having the same gradient of the $\mu$-slip curve (FIG. 5), the transformed controlled variables are decoupled. The sum $(\omega_1 + \omega_2)$ of the rotational speeds is formed in an adder 14 (=2×rotational speed of the cardan shaft). From this sum, the divider 15 forms the rotational speed of the cardan shaft, so that $(\omega_1 + \omega_2)/2$ can also be measured directly at the cardan shaft. Next in sequence is an individual wheel controller 16 (comparable to a select-low controller in a 3-channel ABS), which preferably, as an output variable 1, transmits signals corresponding to braking torques.

A subtractor 17 generates the difference ($\omega_1-\omega_2$), which is likewise halved in the divider block 18 and fed to a controller 19, which can be a PI controller, but can also further take account of dead times and the like. The outputs of the controllers 16 and 19 are fed to an adder 20 and to a subtractor 21. The output signals from the units 21 and 22 are fed to an amplifier 22 with the gain $C_n$ which effects a limitation of the manipulated variable (see above for mode of operation). The output signals of the amplifier 22 are once again valve opening times $u_1$ and $u_2$. The latter act on respective actuators 23 and 24 (valves for the two wheel brakes), and vary the brake pressures and thus the braking torques $M_{B1}$ or $M_{B2}$. As a result, the rotational wheel speeds $\omega_1$ and $\omega_2$ are changed via the controlled system (block 25); the sensors contained in block 25 measure the new rotational speeds.

The concept described last can also be used in the case of differentials having a locking action.

The two concepts relating to multivariable control can be transferred mutatis mutandis to vehicles having all-wheel drive.

Definitions $J_G$ ... moment of inertia, reduced to rotational wheel speed, of the drive train up to the differential
$J$ ... moment of inertia of a wheel
$\omega$ ... rotational wheel speed
$M_S$ ... driving moment of road friction
$M_B$ ... torque
$\omega_F$ ... free-rolling rotational wheel speed
$r$ ... dynamic wheel radius
$\theta$ ... transformation matrix
$\theta^{-1}$ ... inverse transformation matrix
$S(z)$ ... transfer matrix of the system
$S^*(z)$ ... transfer matrix of the transformed system (diagonal matrix)
$R(z)$ ... multivariable controller (generally non-diagonal)
$R^*(z)$ ... controller to be designed (diagonal matrix with independent single-variable controllers on the diagonal)

We claim:

1. In an antiblocking system for the driven wheels of an axle, said system containing sensors for determining the wheel speeds of the respective wheels, a two-channel evaluation circuit to which the respective wheel speed signals from said sensors are fed and which generates respective analog brake pressure control signals for the respective wheels, and respective brake pressure control means, responsive to the respective brake pressure control signals, for varying the brake pressure of the respective driven wheels to prevent blocked wheels; the improvement comprising means for providing at least partial compensation for coupling between the driven wheels, said means for providing including a decoupling means which supplements the evaluation circuit to form a two-variable controller and which is connected as electronic coupling between the two channels downstream of the evaluation circuit, with this decoupling means having a transfer matrix $G(z)$ whose elements $G1(z)$ and $G2(z)$ determine its output variables $u'_1(z)$ and $u'_2(z)$ in accordance with the relationships $u'_1(z)=G1(z)\bar{u}_1(z)+G2(z)\bar{u}_2(z)$ and $u'_2(z)=G2(z)\bar{u}_1(z)+G1(z)\bar{u}_2(z)$, where $\bar{u}_1(z)$ and $\bar{u}_2(z)$ are the respective analog output signals of the two channels of the evaluation circuit, and the elements $G1(z)$ and $G2(z)$ of the matrix are constants determined to provide decoupling by varying the brake pressure of the driven wheels.

2. An antiblocking system according to claim 1, wherein the elements of the matrix are determined experimentally.

3. An antiblocking system according to claim 1, wherein the decoupling means comprises a linear two-variable system and a downstream connected amplifier which amplifies the output signals of the linear two-variable system to the same extent and whose gain depends on the magnitude of the output signals of the linear two-variable system such that the gain becomes smaller with an increase in one of the output signals.

4. In an antiblocking system for the driven wheels of an axle, with said system containing sensors for determining the respective wheel speeds, a two-channel evaluation circuit to which the respective wheel speed signals from the sensors are fed and which includes respective, controllers for generating respective brake pressure control signals, and brake pressure control devices, responsive to the brake pressure control signals, for varying the brake pressure at the respective wheels, in order to prevent blocked wheels; the improvement comprising means for feeding one channel of said evaluation circuit, as an input value, a variable corresponding to the sum of the two respective wheel speed signals, and the other channel of said evaluation circuit, as an input value, a variable corresponding to the difference of the two speed respective wheel signals; wherein the controller of the one channel is an individual wheel controller and the controller of the other channel has a control characteristic which has at least proportional and integral components; and wherein means are provided for forming the brake pressure control signal for the control device to vary the brake pressure of the one channel by addition of the output signals of the two controllers and the brake pressure control signal for the control device to vary the brake pressure of the other channel by subtraction of the output signals of the two controllers.

5. An antiblocking system according to claim 4, wherein an amplifier is connected upstream of the brake pressure control devices, with the amplifier amplifying in both pressure control signals to the same extent and having a gain $C_n$ which depends on the magnitude of the pressure control signals such that the gain becomes smaller with an increase in one of the output signals.

6. An antiblocking system according to claim 4, wherein the controller of the other channel is a nonlinear PI scanning controller.

* * * * *